May 18, 1954  J. G. BRADBURY  2,678,801
TAMPER PROOF PLUG VALVE
Filed Oct. 5, 1949
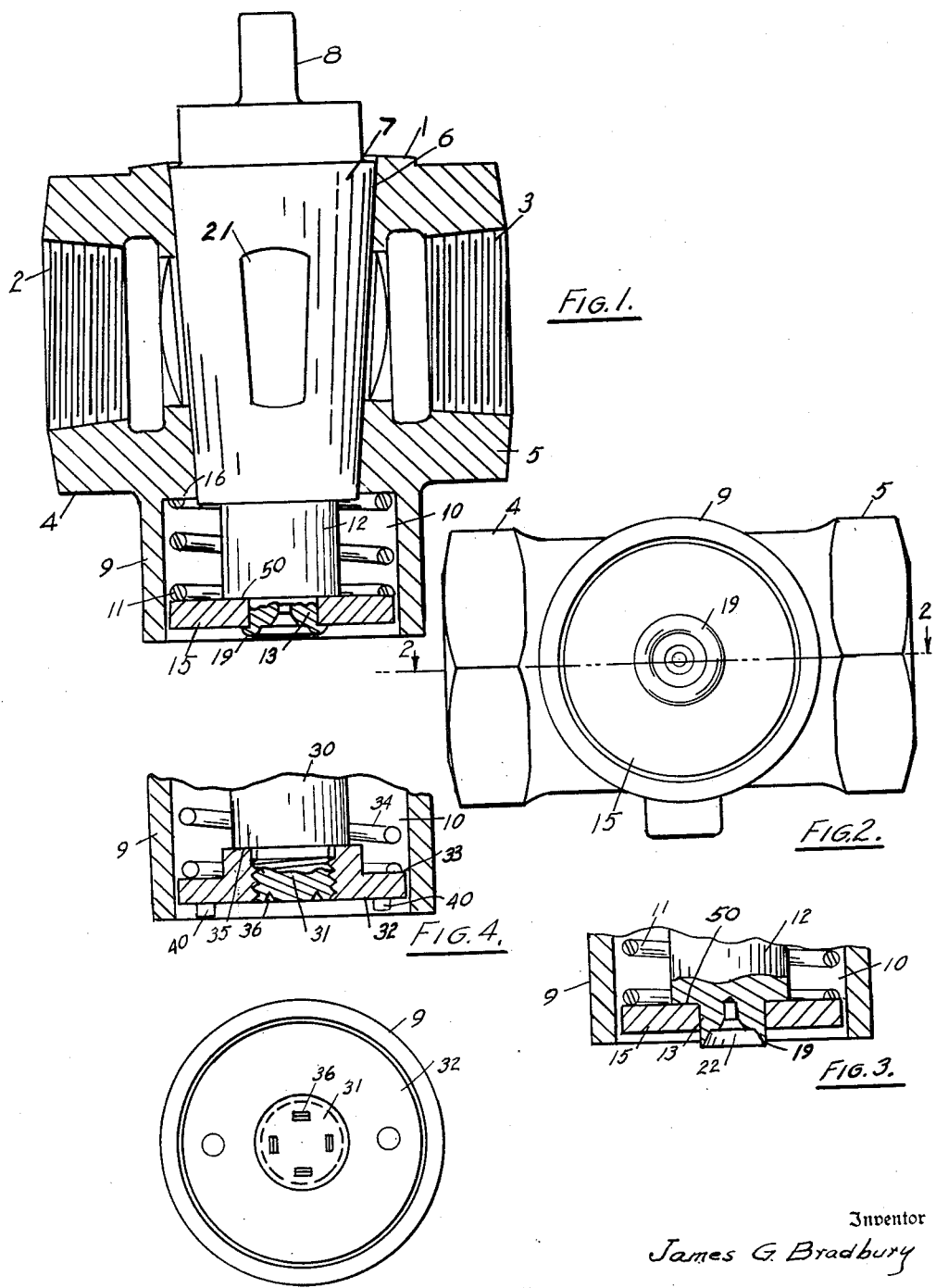
Inventor
James G. Bradbury
By
Florian G. Miller
Attorney Patented May 18, 1954

2,678,801

UNITED STATES PATENT OFFICE 2,678,801

TAMPERPROOF PLUG VALVE

James G. Bradbury, Erie, Pa., assignor to Hays Manufacturing Company, Erie, Pa., a corporation of Pennsylvania Application October 5, 1949, Serial No. 119,650

1 Claim. (Cl. 251—181)

This invention relates generally to plug valves and more particularly to a tamper proof plug valve to prevent disconnection thereof by unauthorized persons.

Attempts have been made to cover the nuts on a depending threaded portion of the stop plug in plug valves but inasmuch as these caps or covers are easily removed, unauthorized persons frequently remove the cap or cover and turn the nut when the valve becomes frozen. The lower end of the plug is sheared off in many instances because of corrosion or freezing of the plug or because the nut is corroded or frozen onto the threaded portion of the plug. When the lower end of the plug is sheared off, it is blown out with the result that fires, explosions, and other damage results from the escaping gas. In some cases, the threads are stripped, thereby allowing the plug to blow out.

It is, accordingly, an object of my invention to overcome the above and other defects in present plug valves and it is more particularly an object of my invention to provide a plug valve which is tamper proof, which is simple in construction, economical in cost, economical in manufacture, and efficient in operation.

Another object of my invention is to provide spring means in conjunction with a tapered plug in a plug valve which causes the plug to seat at all times, which minimizes the freezing on its seat, and which permits limited longitudinal movement of the plug by tapping the bottom thereof to unfreeze same.

Another object of my invention is to provide novel means of securing a washer or the like on the lower threaded portion of a plug which cannot be engaged by a wrench or similar tool.

Other objects of my invention will become evident from the following detailed description, taken in conjunction with the accompanying drawings, in which Fig. 1 is a view taken on the line 2—2 of Fig. 2;

Fig. 2 is a bottom view of the plug valve shown in Fig. 1;

Fig. 3 is a fragmentary cross sectional view of the bottom of the plug and assembled elements in my novel plug valve before the beading thereof;

Fig. 4 is a fragmentary vertical sectional view of a modified form of the lower end of my novel plug valve shown in Fig. 1; and Fig. 5 is a bottom view of my modified form of plug valve shown in Fig. 4.

Referring now to the drawings, I show in Figs. 1, 2, and 3 a plug valve comprising a cylindrical body 1 having aligned apertures 2 and 3 extending laterally outwardly thereof in bossed portions 4 and 5 to provide an inlet and an outlet for the plug valve. The body 1 has a vertically extending, internally tapered seat 6 for seating a stop plug 7. The stop plug 7 has a transversely extending aperture 21 and a flat wrench engaging portion or key 8 on the upper end thereof for rotating the plug 7. A cylindrical skirt 9 depends from the body 1 and it provides an open, cylindrically shaped nesting chamber 10 for a spring 11 which is disposed around the reduced portion 12 of the plug 7. The inner diameter of the spring 11 is large enough to permit free vertical movement of the plug 7. The plug 7 has a further reduced, depending end 13 engaged by a flat washer 15. The spring 11 is disposed between the washer 15 and the shoulder 16 in the skirted portion 9 of the body 1. The end 13 of the plug 7 initially has an outwardly projecting, cylindrical portion 19 shown in Fig. 3 forming an extension of the end 13 which is bent, pressed, or beaded over the engaging washer 15 by any suitable conventional means thereby preventing any rotation or removal of the washer 15. The washer 15 is preferably made of a metal which is comparatively hard such as steel to make it difficult to remove the same by a chisel or the like.

In the assembly of my novel plug valve, it is merely necessary to dispose the plug 7 on the seat 6 of the body 1 as shown in Fig. 1, place the spring 11 around the reduced portion 12 of the plug 7, and engage the washer 15 with the depending end 13 of the plug 7 until the washer 15 engages the shoulder 50 formed between the reduced portion 12 and the end 13 of the plug 7. The outwardly projecting portion 19 of the end 13 of the plug 7 is then beaded over the inner side of the washer 15 in any conventional manner. The plug 7 may then be rotated by the key 8 to an open position with the aperture 21 therein aligned with the inlet and outlet apertures 2 and 3 or in a closed position as shown in Fig. 1. The end 13 of the plug 7 is preferably provided with a countersunk recess 22 for centering a beading tool.

The spring 11 is of sufficient strength to maintain the plug 7 on its seat 6 in the body 1 while still permitting free rotation thereof by means of the key 8 without exerting too great a force. The outer face of the washer 15 is disposed within the skirted portion 9 of the body 1 and it is of substantially the same diameter as the inner diameter of the skirted portion 9 so that it cannot be engaged by any form of wrench. It will thus be seen that an unauthorized person will not be able to remove the washer 15 with the ordinary tools at his disposal thereby preventing the shearing or breaking off of the depending end 13 of the plug 7 and the blowing out of the plug 7 to cause fires and explosions from escaping gas as has resulted with the use of prior stop cocks in gas lines. The plug 7 may be unfrozen by tapping the end 13 thereof wherein the spring 11 returns it to its seat.

A modified form of my novel plug valve is shown in Figs. 4 and 5. The body 1 and skirt 9 are the same as shown in Fig. 1. The reduced portion 30 depends from a plug as shown in Fig. 1 with a reduced threaded end 31 for threadably engaging a threaded washer 32. The washer 32 has a cut away portion 33 for nesting the bottom of a coil spring 34. The washer 32 engages a shoulder 35 formed between the reduced portion 30 and the reduced threaded end 31 of the plug. The washer 32 is substantially the same diameter as the inner diameter of the skirted portion 9 of the body 1 so that it cannot be engaged by a wrench, chisel, or other tool. The washer 32 is staked to the threaded end 31 of the plug by punching spaced recesses 36 around the periphery of the outer end face of the depending threaded end 31 as shown in Figs. 4 and 5. The recesses 36 are usually punched after any projecting end of the threaded end 31 of the plug is faced off with the outer face of the washer 32 so as to make a smooth outer end face. Diametrically opposed bosses 40 are initially provided on the washer 32 to permit engagement thereof by a suitable tool to rotate the washer 32 and thread it on the threaded end 31 of the plug. After the washer 32 is in threadable engagement with the threaded end 31 of the plug and in engagement with the shoulder 35, the projecting bosses 40 as well as any projecting outer end of the threaded end 31 of the plug may be faced off with the outer face of the washer 32 by any suitable means.

From the foregoing, it will be seen that I have provided a tamper proof plug valve which prevents removal of the plug by the ordinary tools owned by the average householder, which prevents rotation of the end of the plug and the resultant shearing of the end thereof, and which has spring means and other structural elements for providing an efficient and durable plug valve.

Various changes may be made in the specific embodiment of my invention without departing from the spirit thereof or from the scope of the appended claim.

What I claim is:

A plug valve comprising a body having a tapered seat centrally thereof and an inlet and an outlet and a skirted portion axially aligned with said tapered seat, an apertured rotatable plug disposed on said seat in said body having a transverse apertured portion for registering with said inlet and said outlet and having a reduced threaded end extending into said skirted portion of said body, said reduced threaded end defining a shoulder spaced a predetermined distance from the end of the reduced threaded end of said plug, a cylindrical member substantially the diameter of the internal diameter of said skirted portion having a threaded central aperture threadably engaged with the threaded end of said plug, one side of said threaded cylindrical member and said threaded end being substantially flush and the other side of said cylindrical member bearing against said shoulder, and a spring in said skirted portion between said threaded cylindrical member and the closed end of said skirted portion of said body urging said plug on its seat, the threaded end of said plug being recessed at spaced points whereby lateral portions of the outer end of said plug are deflected outwardly and said threaded cylindrical member is thereby staked on the end of said plug, said threaded cylindrical member having diametrically opposed outwardly extending bosses adapted to be engaged by a special tool to rotate said cylindrical member, said skirted portion extending beyond said bosses whereby a special tool is required to engage said bosses to remove said cylindrical member from said threaded end of said plug.

References Cited in the file of this patent

UNITED STATES PATENTS

| Number | Name | Date |
|---|---|---|
| 172,870 | Deeds | Feb. 1, 1876 |
| 1,101,868 | McCoy | June 30, 1914 |
| 1,172,106 | Brumby | Feb. 15, 1916 |
| 1,664,712 | Stanley | Apr. 3, 1928 |
| 1,842,117 | Renshaw | Jan. 19, 1932 |
| 2,138,767 | Matthews | Nov. 29, 1938 |